Dec. 8, 1970    R. B. LIGHTNER    3,545,078
METHOD FOR MAKING STRIP CONDUCTOR COILS
AND PARTS THEREFOR
Filed March 7, 1966    4 Sheets-Sheet 1

INVENTOR
ROBERT B. LIGHTNER
BY
HIS ATTORNEYS

Dec. 8, 1970    R. B. LIGHTNER    3,545,078
METHOD FOR MAKING STRIP CONDUCTOR COILS
AND PARTS THEREFOR
Filed March 7, 1966    4 Sheets-Sheet 2

INVENTOR
ROBERT B. LIGHTNER
BY
HIS ATTORNEYS

Dec. 8, 1970  R. B. LIGHTNER  3,545,078
METHOD FOR MAKING STRIP CONDUCTOR COILS
AND PARTS THEREFOR
Filed March 7, 1966  4 Sheets-Sheet 3
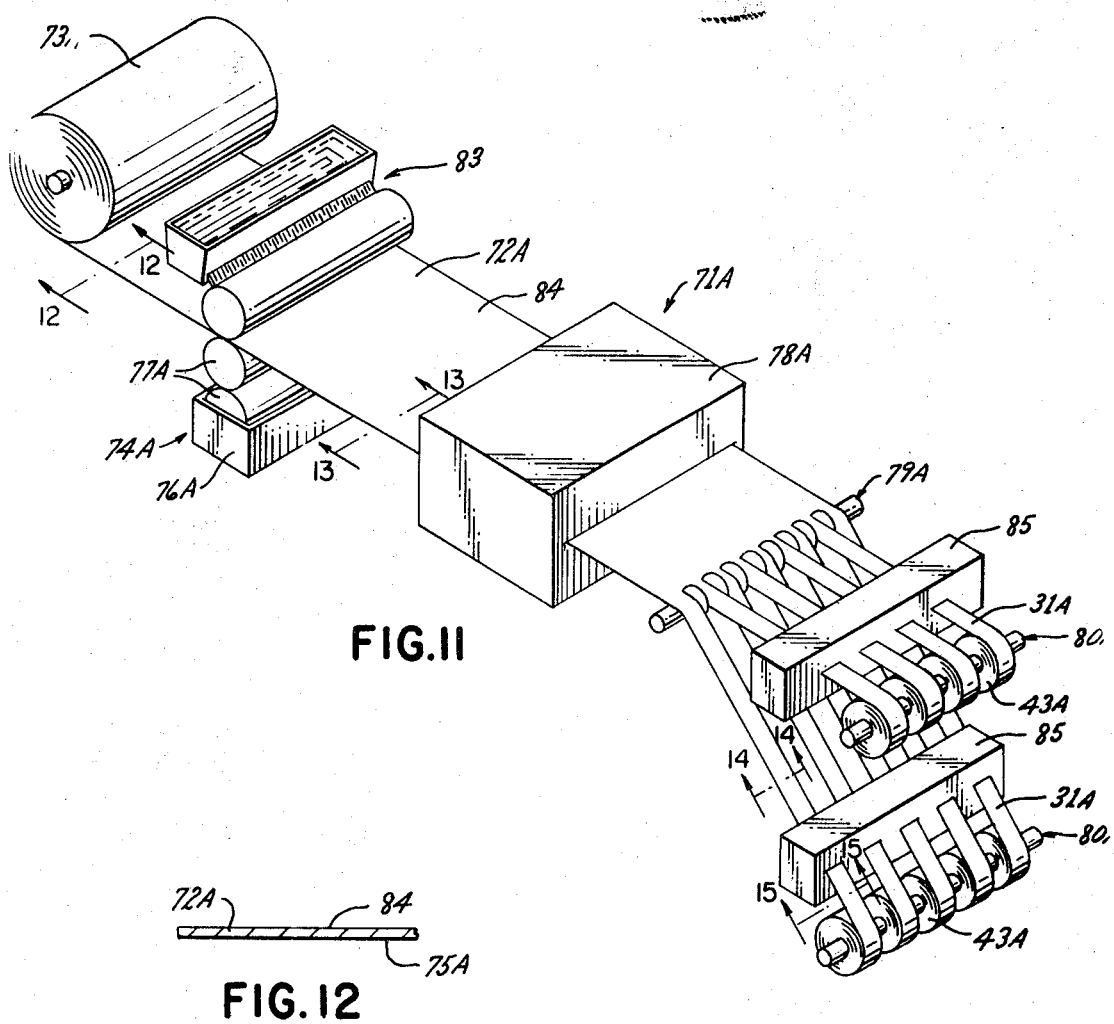
FIG.11
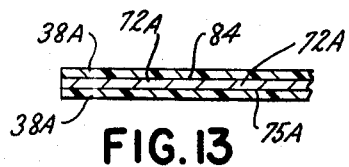
FIG.12
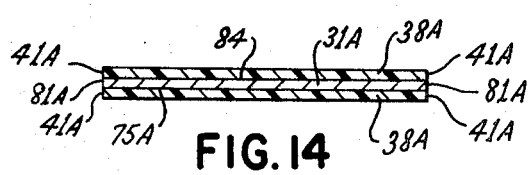
FIG.13
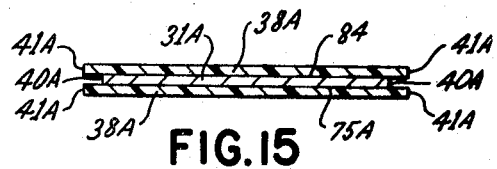
FIG.15
FIG.14
INVENTOR
ROBERT B. LIGHTNER
BY Glenn, Palmer,
Matthews & Lyne
HIS ATTORNEYS Dec. 8, 1970 R. B. LIGHTNER 3,545,078
METHOD FOR MAKING STRIP CONDUCTOR COILS
AND PARTS THEREFOR
Filed March 7, 1966 4 Sheets-Sheet 4

INVENTOR
ROBERT B. LIGHTNER

BY

HIS ATTORNEYS

United States Patent Office 3,545,078
Patented Dec. 8, 1970

3,545,078
METHOD FOR MAKING STRIP CONDUCTOR COILS AND PARTS THEREFOR
Robert B. Lightner, Henrico County, Va., assignor to Reynolds Metals Company, Richmond, Va., a corporation of Delaware
Filed Mar. 7, 1966, Ser. No. 532,451
Int. Cl. H01f 7/06
U.S. Cl. 29—605                      4 Claims

ABSTRACT OF THE DISCLOSURE

This disclosure relates to a method and apparatus for making a strip conductor coil from a strip of conductive material that has an epoxy resin coated on at least one side thereof so as to have the edges of the coating coextensive with the edges of the strip of conductive material. Thereafter, the side edges of the strip of conductive material are inwardly removed from the edges of the coating thereon by an etching operation so that when the etched and coated conductive strip is subsequently wound into a strip conductor coil, the side edges of the coating projecting beyond the adjacent edges of the strip of conductive material protect and prevent shorting across adjacent coils of the conductive strip. After such coated and etched conductive strip has been wound in coil form, the coating thereon is subsequently heated to heat seal together the adjacent coils in the strip conductor coil so as to form a substantially solid structure that cannot be unwound.

---

This invention relates to an improved method and apparatus for making strip conductor coils as well as to an improved method and apparatus for making strip conductor coil stock or the like.

It is well known from the co-pending patent application, Ser. No. 497,069, filed Oct. 18, 1965, that a method and apparatus can be provided for continuously winding a strip of conductive material upon hollow cylindrical cores or the like to produce strip conductor coils, each having the desired number of turns thereon, the strip of conductive material being wound on each core, together with a strip of insulating material to provide insulation between adjacent coils of the resulting strip conductor coil. Such method and apparatus have means for cold welding or otherwise securing terminal leads to the strip of conductive material in such a manner that each completed strip conductor coil has an outwardly directed lead at the inner end thereof and an outwardly directed lead at the outer end thereof whereby the coil can subsequently have current passed therethrough when a power source is interconnected to the leads for the intended purpose.

However, this invention provides a method and apparatus of the above type wherein the strip of conductive material has an insulating coating disposed on one side thereof in such a manner that the longitudinal side edges of the strip of conductive material are offset inwardly relative to the adjacent longitudinal side edges of the coating so that when the coated strip is subsequently wound into a strip conductor coil in the manner previously described, the insulating coating not only insulates adjacent coils of the strip of conductive material from each other across the transverse dimension thereof but also at the side edges thereof as will be more apparent hereinafter.

In addition, this invention provides an improved method and apparatus for making such coated strip conductor stock for forming the aforementioned strip conductor coils.

Accordingly, it is an object of this invention to provide an improved method for making strip conductor coils or the like, the method of this invention having one or more of the novel features set forth or hereinafter shown or described.

Another object of this invention is to provide an improved apparatus for making a strip conductor coil or the like, the apparatus of this invention having one or more of the novel features set forth above or hereinafter shown or described.

A further object of this invention is to provide an improved method for making strip conductor coil stock or the like.

Another object of this invention is to provide an improved apparatus for making stock for a strip conductor coil or the like.

Other objects, uses and advantages of this invention are apparent from a reading of this description, which proceeds with reference to the accompanying drawings forming a part thereof and wherein.

Figure 6:
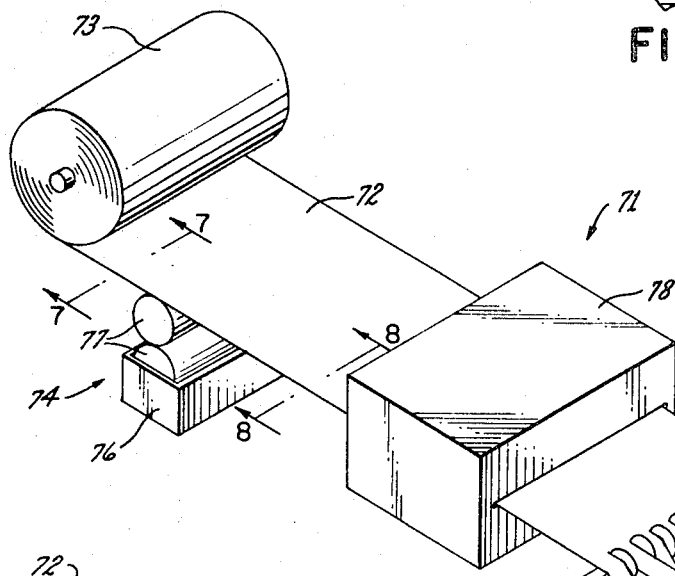
FIG. 6 is a perspective view illustrating one embodiment of the method and apparatus of this invention for making the strip conductor coil stock to be utilized in the method and apparatus of FIG. 2.
Figure 7:
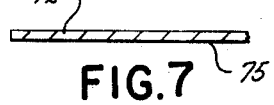
FIG. 7 is an enlarged, fragmentary, cross-sectional view taken on line 7—7 of FIG. 6.
Figure 8:
Figure 9:
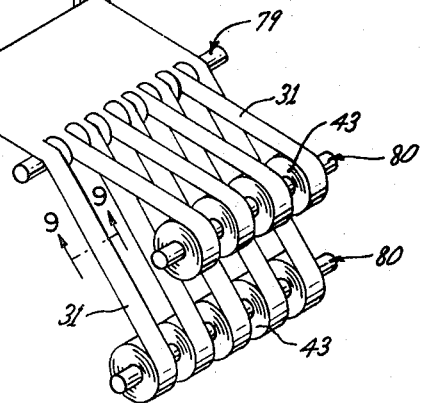

FIGS. 8 and 9 are views similar to FIG. 7 and are respectively taken on line 8—8 and 9—9 of FIG. 6.

Figure 10:
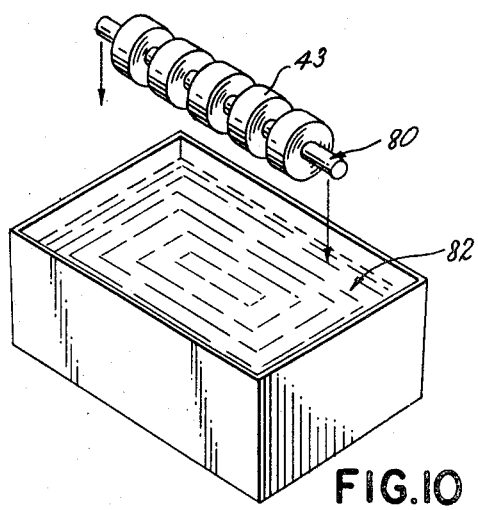

FIG. 10 is a perspective view illustrating one method of this invention for etching the stock produced by the method and apparatus of FIG. 6.

FIG. 11 is a view similar to FIG. 6 and illustrates another embodiment of the method and apparatus of this invention.

FIGS. 12–15 are respectively enlarged, cross-sectional views taken on lines 12—12, 13—13, 14—14 and 15—15 of FIG. 11.

Figure 16:
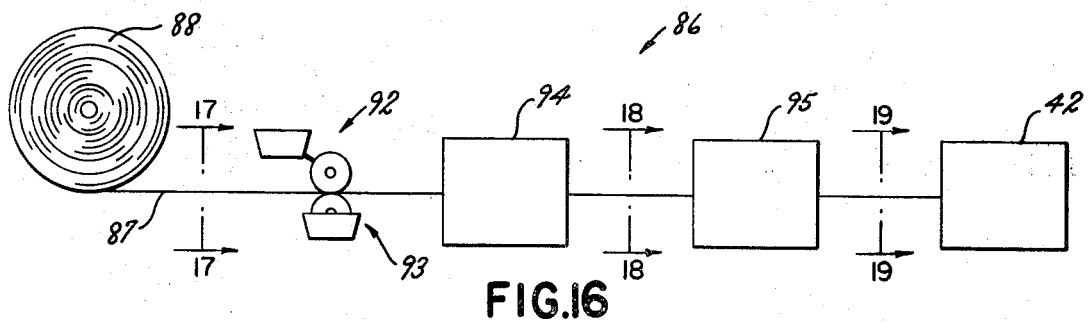

FIG. 16 is a schematic view illustrating another embodiment of this method and apparatus of this invention.

Figure 17:
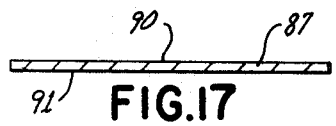
Figure 18:
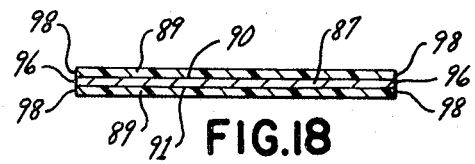
Figure 19:
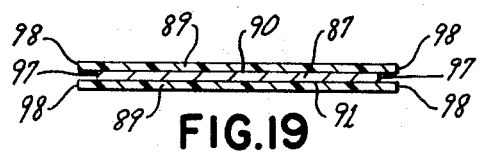

FIGS. 17–19 are respectively enlarged cross-sectional views taken on lines 17—17, 18—18 and 19—19 of FIG. 16.

Figure 20:
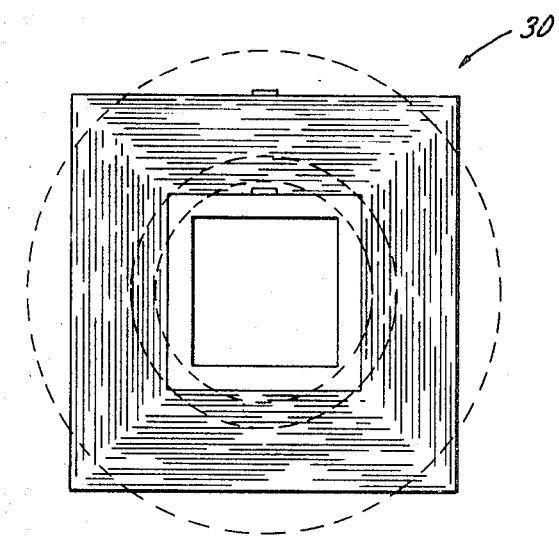

FIG. 20 is an enlarged side view of another embodiment of the strip conductor coil formed by the teachings of this invention.

While the various features of this invention are hereinafter described and illustrated as being particularly adaptable for providing a strip conductor coil or the like, it is to be understood that the various features of this invention can be utilized singly or in any combination thereof to provide other structure as desired.

Therefore, this invention is not to be limited to only the embodiments illustrated in the drawings, because the drawings are merely utilized to illustrate some of the wide variety of uses of this invention.

Figure 1:
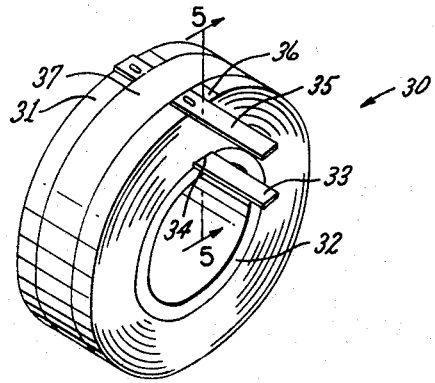
FIG. 1 is a perspective view illustrating the improved strip conductor coil of this invention.

Referring now to FIG. 1, a strip conductor coil formed according to the teachings of this invention is generally indicated by the reference numeral 30 and comprises a strip of coated conductive material 31 wound upon itself on a hollow cylindrical core 32, the strip 31 having an inner lead 33 secured to an inner end 34 thereof and an outer lead 35 secured to the outer end 36 thereof. A strip of pressure sensitive tape 37 is wrapped around the coil 30 to hold the strip 31 in its coiled relation.

Figure 4:
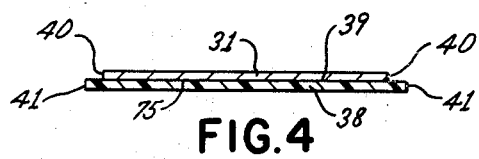
FIG. 4 is a cross-sectional view taken on line 4—4 of FIG. 3.
Figure 5:
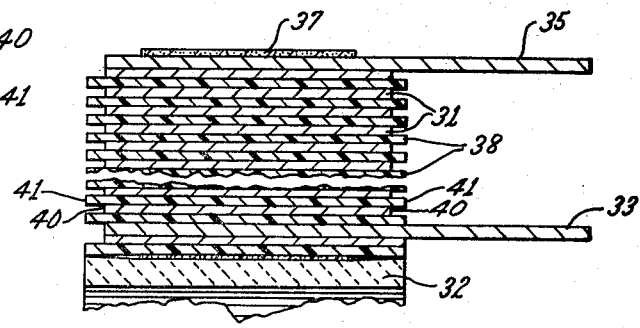
FIG. 5 is a enlarged, fragmentary, cross-sectional view taken on line 5—5 of FIG. 1.

As illustrated in FIGS. 4 and 5, the strip of conductive material 31 has an insulating coating 38 secured to one side 39 thereof in a manner hereinafter described, the strip of conductive material 31 having the opposed longitudinal edges 40 thereof inwardly offset in a manner hereinafter described to the adjacent longitudinal side edges 41 of the coating 38 so that when the coated strip 31 is wound to form the coil 30 in the manner illustrated in FIGS. 1 and 5, the insulating coating 38 not only insulates adjacent turns of the conductive strip 31 from each other across the transverse dimension thereof but also insulates the adjacent turns of the conductor strip 31 at the side edges thereof to prevent shorting across the strip of conductive material 31.

Figure 2:
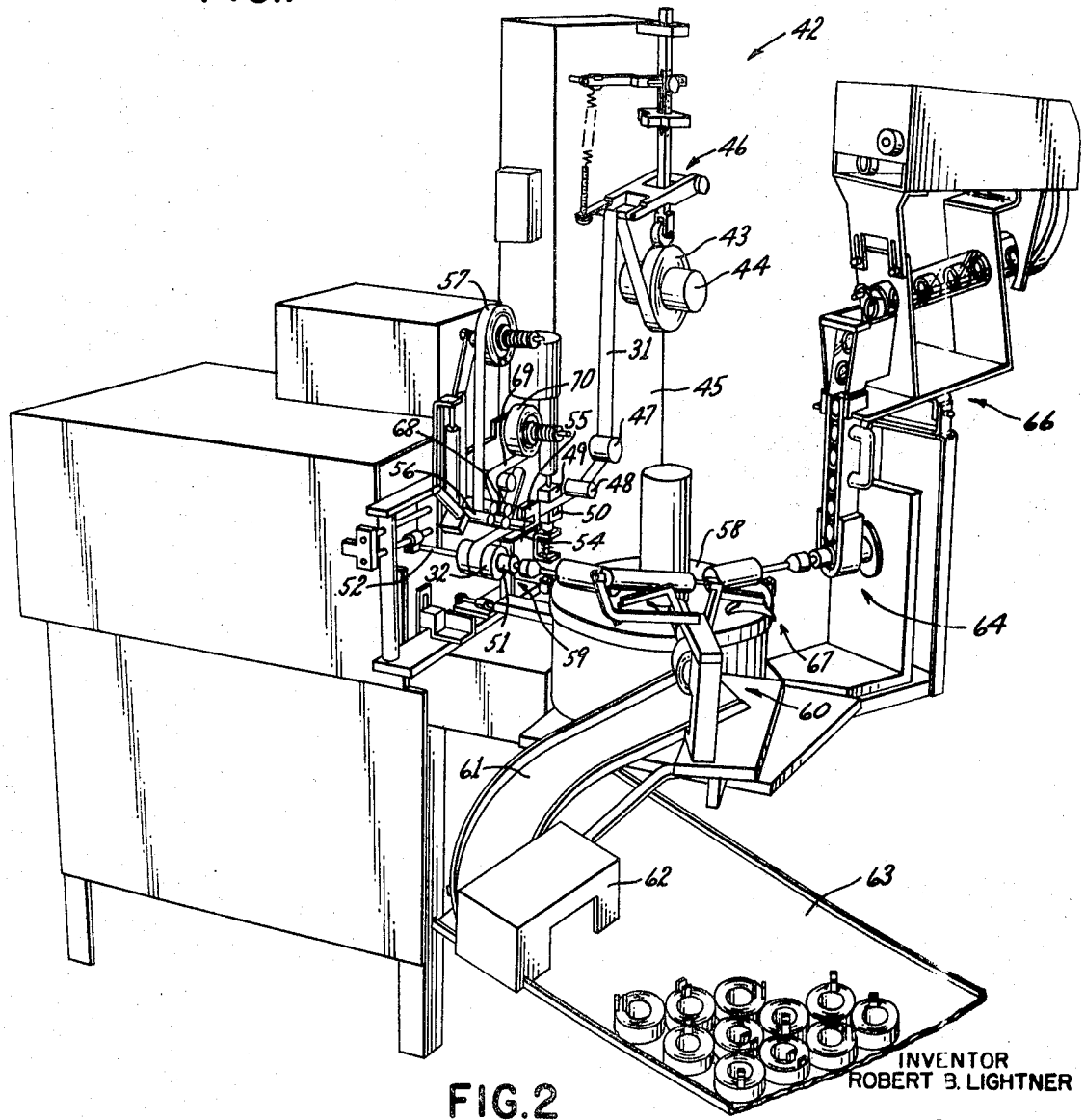
FIG. 2 is a perspective view illustrating one embodiment of the method and apparatus of this invention.

One method and apparatus of this invention for forming the strip conductor coil 30 of FIG. 1 is generally indicated by the reference numeral 42 in FIG. 2 and is substantially the same as the method and apparatus disclosed and claimed in the aforementioned copending patent application.

Therefore, only the general operation and structure of the method and apparatus 42 will now be described, as further details and functions thereof are fully set forth in the aforementioned co-pending patent application.

As illustrated in FIG. 2, a supply roll 43 of the coated conductive strip 31, formed in a manner hereinafter set forth, is rotatably carried by shaft means 44 of the frame structure 45 of the apparatus 42 and has the leading end thereof adapted to pass around a slack reducing and tensioning means 46 and be fed past guide rollers 47 and 48 through cooperating cold welding die means 49 and 50 to a core 32 carried on a mandrel 51 rotatably interconnected to a drive shaft 52. Thus, as the mandrel 51 is rotated by the drive shaft 52, the core 32 thereon is rotated in unison therewith and draws the coated strip of material 31 from the supply roll 43 onto the core 32 to form the strip conductor coil 30.

Figure 3:
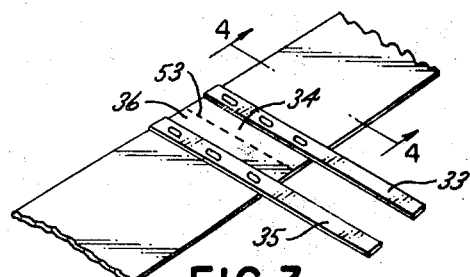
FIG. 3 is a fragmentary, perspective view illustrating the leads attached to the strip conductor coil stock by the apparatus and method of FIG. 2.

After the desired number of turns of the coated strip 51 has been wound on the core 32 in the manner previously described, rotation of the drive shaft 52 is momentarily stopped and lead material is fed between the upper die block 49 and the strip of conductive material 31 in the manner set forth in the aforementioned co-pending patent application and is cold welded thereto in side-by-side relation by the cooperating die blocks 49 and 50 in the manner illustrated in FIG. 3 to form the outer lead 35 for the coil being formed at the drive shaft 52 and to form the inner lead 33 for a subsequently wound strip conductor coil 30, the cooperating die blocks 49 and 50 forming a separation line 53 between the secured leads 33 and 35 in the manner illustrated in FIG. 3.

After the leads 33 and 35 have been cold welded to the strip 31 in the manner illustrated in FIG. 3, the drive shaft 52 is further jogged to further draw the strip 31 onto the coil 32 until the secured leads 33 and 35 are disposed over a table means 54 whereby the strip 31 is held between the table 54 and a cooperating top table means 55 so that as the drive shaft 52 again continues to rotate, the strip 31 will separate at the tear line 53 to form the outer end 36 of the strip 31 for the coil 30.

As the end 36 of the severed strip 31 is being wound on the core 32 by the drive shaft 52, a taping head means 56 applies the tape 37 around the coil 30 at the drive shaft 52 from a supply roll 57 thereof and cuts off the same to complete the coil 30 in the configuration illustrated in FIG. 1.

After the coil 30 has been formed at the drive shaft 52 in the manner previously described, the three mandrels 51 being carried by an indexible table 58 of the apparatus 42 are retracted radially inwardly to carry the completed coil 30 away from the drive shaft 52 at the station 59 while simultaneously ejecting a previously formed strip conductor coil 30 at the station 60, the completed coil 30 being ejected at the station 60 passing down a chute 61 and through a heating means 62 to "block" the coil 30 in a manner hereinafter described and be collected at a table 63 for subsequent testing and packaging thereof. The third mandrel 51 being simultaneously retracted at the third station 64 carries a core 32 from a core supplying hopper means 66 which functions in the manner set forth in another co-pending patent application, Ser. No. 497,073, filed Oct. 18, 1965, wherein the details and operation thereof are fully claimed and set forth.

With the mandrels 51 now in their retracted position, the table 58 is indexed in a clockwise direction in FIG. 2 to bring the new core 32 adjacent the station 59 while the previously wound strip conductor coil 30 is carried to the station 60.

With the mandrels 51 now in their new indexed positions, the mandrels 51 are simultaneously moved radially outwardly whereby the core carrying mandrel 31 is interconnected to the drive shaft 52 while the mandrel 51 at the station 64 is received in the hopper means 66 to telescope within another core 32, the coil carrying mandrel 51 being positioned at the station 60 so that subsequent retraction of the mandrels 51 will cause ejection mechanism 67 at the station 60 to strip the coil 50 from the mandrel 51 in the manner previously described.

With the mandrel 51 at the station 59 now interconnected to the drive shaft 52, a second taping head means 68 applies a pressure sensitive tape 69 from a supply roll 70 thereof against the severed end 34 of the conductive strip 31 being held between the table means 54 and 55 and extends the tape 68 onto the core 32 at the station 59 whereby the length of tape 68 is then cut by suitable knife means to sever the same from the supply roll 70.

After the length of tape 68 has interconnected the end 34 of the conductive strip 31 to the core 32, the drive shaft 52 is rotated so that the strip of tape 68 interconnecting the end 34 of the conductor strip 31 to the coil 32 will draw the conductor strip 31 from the supply roll 43 onto the core 32 at the station 59 to form another strip conductor coil 30 in the manner previously described.

Therefore, it can be seen that the method and apparatus 42 illustrated in FIG. 2 is adapted to continuously form strip conductor coils 30 of FIG. 1 from the supply roll 43 of the coated conductive strip 31.

One embodiment of the method and apparatus of this invention for forming the coiled strip stock 43 is generally indicated by the reference numeral 71 in FIG. 6 and will now be described.

A substantially wide strip of conductive material 72, such as aluminum-containing foil or the like, is fed from a supply roll 73 thereof to the right in FIG. 6 whereby coating means 74 applies the coating 38 completely across the under surface 75 of the strip 72.

For example, the coating 38 can comprise a heat sealable epoxy resin coating applied in liquid form from a reservoir 76 thereof by roll means 77 in a conventional manner. The coated wide strip 72 subsequently passes through a heating device 78 which partially cures the coating 38 to remove the tackiness thereof so that subsequent winding of the coating 38 will not cause the same to adhere to an engaged surface thereof. After the strip 72 has passed through the curing oven 78, the wide coated strip 72 is cut into a plurality of narrow strips 31 by conventional cutting means 79 in a continuous manner so that the resulting narrow strips 31 can be wound into a plurality of supply rolls 43 by suitable winding means 80.

Thus, it can be seen that the method and apparatus 71 of this invention is adapted to continuously form a plurality of supply rolls 43 of coated conductive strips 31 to be subsequently utilized in the apparatus 42 of FIG. 2 or the like.

However, as fully illustrated in FIG. 9, each narrow strip 31 of conductive material has the longitudinal side edges 81 thereof disposed substantially coplanar with the side edges 41 of the insulating coating 38 thereon. Thus, should the strips 31 being formed by the apparatus and method 71 of FIG. 6 be subsequently used in the condition illustrated in FIG. 9 to form the strip conductor coils 30 of this invention, not only the burrs of the slit edges 81 of the strip of conductive material 31 will cause shorting across adjacent turns of the strip 31 in the subsequently formed strip conductor coil 30, but also any scratches formed across the side edges of the strip conductor coil 30 will cause shorting across adjacent turns of the conductor strip 31.

Therefore, this invention provides a means for inwardly offsetting the longitudinal side edges of the conductor strip 31 relative to the longitudinal side edges 41 of the coating 38 thereon before the coil winding operation to prevent the aforementioned adverse shorting problems.

In particular, reference is now made to FIG. 10 wherein a plurality of supply rolls 43 formed by the method and apparatus of 71 are adapted to be carried by the winding means 80 and be disposed in an etching bath 82 for the desired length of time whereby the etching bath 32 inwardly etches the longitudinal side edges of the coil conductive strips 31 to form the new longitudinally side edges 40 thereof as illustrated in FIG. 4, which are inwardly offset relative to the longitudinal side edges 41 on the coatings 38 thereof.

In this manner, one manufacturer can produce the supply rolls 43 of coated conductive strip material 31 wherein the side edges 40 of the strip of material 31 will be inwardly offset relative to the longitudinal edges 41 of the coating 38 thereof and can supply such etched supply rolls 43 to the strip conductor coil manufacturer who can utilize the etched supply rolls 43 in the method and apparatus 42 to form the improved strip conductor coils 30 of this invention without requiring the coil winding manufacturer to maintain etching equipment and personnel.

While the supply rolls 43 from the method and apparatus 71 of FIG. 6 can be etched in the manner illustrated in FIG. 10 with any suitable etching material, one embodiment thereof that has been found satisfactory is to caustic or acid etch the coils 43 by the bath 82 for approximately six minutes whereby the etched rolls 43 are rinsed in water at room temperature and then the rolls 43 are deoxidized and neutralized by immersing the same for approximately two minutes in a 5% sulphuric acid solution at room temperature. Thereafter, the supply rolls 43 are rinsed and dried and can be stored or shipped for subsequent use thereof by the method and apparatus 42 of FIG. 2. For example, such etching operation on a strip 31 of aluminum foil approximately 0.00125" thick and 1.19" wide, having 600 turns on the core 32 will have the inwardly offset edges thereof inwardly offset approximately 0.004" from the edges of the coating 38.

It should be noted that if a supply roll 33 formed according to the teachings of this invention should be accidentally scratched across the side edge thereof to tend to destroy the protruding edges 41 of the coating 38, it can be seen that a scratch across the large diameter of the supply roll 43 will not cause adjacent scratched parts thereof to be aligned when the strip 31 is forming the smaller diameter strip conductor coils 30 so that a shorting problem created by accidental scratching of the large supply roll 43 is most unlikely.

When the etched supply rolls 43 of this invention are utilized in the manner illustrated in FIG. 2, to form the coils 30 of FIGS. 1 and 5, the coating 38 on the completed coil 30 can be subsequently completely cured by heating the coil 30 whereby the coating 38 will heat seal adjacent turns of the strip 31 to itself as well as to the core 32 to completely "block" the coil 30 in the configuration illustrated in FIG. 1 whereby the "blocked" coil 30 will be a substantially solid structure.

While the coil 30 can be heated in any suitable manner to completely cure the coating 38 and "block" the coil 30, the embodiment of the method and apparatus 42 of FIG. 2 includes the heating chamber 62 wherein the ejected coil 30 passes from the chute 61 through the heating device 62 to the table 63 whereby the heating device 62 completely "blocks" the coil 30. For example, the heating chamber 62 can merely be an oven which heats the coils 30 as they pass therethrough to the desired "blocking" temperature. Alternately, the heating chamber 32 can comprise an induction heating means whereby the coil 30 passes between induction coils in such a manner that eddy currents are created in the conductive strip 31 to heat up the coil 30 in a rapid and effective manner to "block" the same. Also, the coil 30, when passing through the heating means 62, can have an electrical current passed through the conductive strip 31 thereof by being interconnected to the leads 33 and 35 thereof so that the resistance created by the conductive strip 31 will heat the coil 30 to a temperature sufficient to "block" the same.

While the strip conductor coils 30 of this invention are illustrated in FIG. 1 as being "blocked" in the cylindrical wound form thereof, it is to be understood that the core 32 being utilized by the method and apparatus 42 of FIG. 2 can comprise relatively flexible or deformable material, such as cardboard or the like, whereby the wound coil 30, prior to the "blocking" operation thereof, can be reshaped into the desired configuration thereof and, when in the reshaped configuration, be heated to "block" the same to maintain the new shape thereof as a substantially solid structure.

For example, reference is made to FIG. 20 wherein the strip conductor coil 30 was originally wound in the cylindrical form illustrated by dotted lines in FIG. 20 in the manner provided by the method and apparatus 42 of FIG. 2 and, thereafter, deformed into substantially square shape thereof before the "blocking" operation whereby the reshaped coil 30 was heated in the deformed square shape illustrated in full lines in FIG. 20 to "block" the same. In this manner, the coil 30 will remain in the solid square configuration of FIG. 20 for its intended use.

While the method and apparatus 71 illustrated in FIG. 6 requires a two-step operation to form an etched supply roll 43 for subsequent use in the method and apparatus 42 of FIG. 2, it is to be understood that the etched supply rolls 43 could be formed in a one-step continuous operation if desired.

For example, reference is now made to FIGS. 11–15 wherein another embodiment of the method and apparatus of this invention for forming the etched supply rolls 43 are generally indicated by the reference numeral 71A and parts thereof similar to the apparatus and methods 71 previously described are indicated by like reference numerals followed by the reference letter A.

As illustrated in FIG. 11, the wide strip of conductive material 72A is drawn from the supply roll 73A thereof in the manner previously described, except that not only does the applicator means 74A apply the coating 38A across the surface 75A thereof in the manner previously described, but also another coating applying means 83 applies a coating 38A completely across the other side 84 of the strip 72. The coated strip 72A then passes through the oven means 78A to partially cure the opposed coatings 38A thereof to remove the tackiness thereof whereby the coated strip 72A is adapted to be cut into a plurality of narrow strips 31A by the previously described slitting means 79A.

After the coated strip 72A has been slit into the plurality of narrow strips 31A by the cutting means 79A, it can be seen in FIG. 14 that each strip 31A has the longitudinal side edges 81A of the conductive strip 31A coplanar with the longitudinal edges 41A of the coating 38A on both sides thereof. However, each strip 31A passes through an etching device 85 which inwardly etches the longitudinal side edges 81A of each conductive strip 31A to form new longitudinal edges 40A thereof inwardly offset from the longitudinal edges 41A of the coatings 38A thereon in the manner illustrated in FIG. 15. After the strips 31A pass through the etching means 85, the same are wound into supply rolls 43A thereof by the previously described winding means 80A whereby the method and apparatus 71A of this invention is adapted to continuously form the etche dsupply rolls 43A to be utilized in the method and apparatus 42 of FIG. 2 in the manner previously described.

If it is desired, the coating, etching and coil making operations previously described can be utilized in one continuous operation to form strip conductor coils 30 of this invention.

In particular, reference is now made to FIG. 16 wherein another method and apparatus of this invention is generally indicated by the reference numeral 86 and will now be described.

As illustrated in FIG. 16, a strip of conductive material 87 having a width desired for subsequent strip conductor coils 30 is fed from a supply roll 88 thereof and has the aforementioned epoxy resin coatings 89 applied to the opposed surfaces 90 and 91 thereof by applying means 92 and 93 in a manner similar to the method and apparatus 71A of FIG. 11. The coated strip 87 passes from the coating means 92 and 93 into an oven means 94 to partially cure the coatings 89 so that the tackiness thereof is removed. The partially cured and coated strip 87 passes from the oven 94 through an etching means 95 which inwardly etches the longitudinal side edges 96 of the coated strip 87 to form new longitudinal side edges 97 thereof which are inwardly offset relative to the longitudinal side edges 98 of the coatings 89 in the manner illustrated in FIG. 19.

Thereafter, the etched coated strip 87 passes from the etching means 95 directly to the apparatus 42 previously described to be fed through the die blocks 49 and 50 thereof to continuously form the strip conductor coils 30 in the manner previously described.

Of course, it is to be understood that the conductive strip 87 of FIG. 16 could be a relatively wide strip to be slit into a plurality of narrow strips between the oven 94 and etching apparatus 95 so that each slit strip could be continuously etched and directed to an apparatus 42 to form strip conductor cores 30 in the continuous manner previously described.

Therefore, it can be seen that this invention not only provides an improved method and apparatus for forming strip conductor coils or the like, but also this invention provides improved methods and apparatus for forming strip conductor coil stock or the like.

While the form of the invention now preferred has been disclosed as required by statute, other forms may be used, all coming within the scope of the claimed subject matter which follows.

What is claimed is:
1. A method for making a strip conductor coil comprising the steps of providing a wide strip of conductive material having longitudinal edges, coating said wide strip with a fluid epoxy resin that forms a coating on at least one side of said wide strip, partially curing said coating by heating said wide coated strip, slitting said wide coated strip into a plurality of narrow coated strips each having the partially cured coating thereon provided with longitudinal edges adjacent longitudinal edges of its respective said narrow strip, winding each narrow coated strip upon itself to form a supply roll of coated conductor material, thereafter inwardly removing said longitudinal edges of each said narrow strip to form new longitudinal edges thereof inwardly offset relative to said longitudinal edges of said coating thereof by disposing each supply roll in an etching bath, winding at least part of said coated narrow strip upon itself from one of said etched supply rolls to form said strip conductor coil with adjacent coils of said narrow strip in said coil being separated from each other only by said coating not only at the transverse dimension thereof, but also at the longitudinal edges thereof, and, thereafter, heating said coating of said coil to permanently cure said coating to cause said coating to heat seal said coils of said conductive strip together and thereby "block" said coil.

2. A method as set forth in claim 1 wherein the last heating step includes the step of heating said coil by induction.

3. A method as set forth in claim 1 wherein the last heating step includes the step of heating said coil by passing an electrical current through said conductive strip of said coil.

4. A method as set forth in claim 1 and including the step of shaping said coil to a predetermined shape before heating said coating of said coil so that said coil will be heat sealed in its predetermined shape.

References Cited

UNITED STATES PATENTS

| | | | |
|---|---|---|---|
| 2,395,736 | 2/1946 | Grundmann | 29—605UX |
| 2,506,026 | 5/1950 | Kifer et al. | 29—605UX |
| 2,915,811 | 12/1959 | Zack et al. | 29—605 |
| 2,985,855 | 5/1961 | Stone | 29—609UX |
| 3,068,119 | 12/1962 | Gotsch | 117—93.2 |
| 3,112,556 | 12/1963 | Zack | 29—605 |
| 3,113,374 | 12/1963 | Zack | 29—605 |
| 3,235,472 | 2/1966 | Smith | 29—605UX |
| 3,278,880 | 10/1966 | Lewis et al. | 29—605X |
| 3,292,243 | 12/1966 | Hofling | 29—605 |
| 3,334,413 | 8/1967 | Smith | 29—605 |
| 3,412,354 | 11/1968 | Sattler | 29—605X |
| 3,378,801 | 4/1968 | Smith | 336—206 |

JOHN F. CAMPBELL, Primary Examiner

CARL E. HALL, Assistant Examiner

U.S. Cl. X.R.

29—25.42; 117—10, 93.2, 232; 336—205